United States Patent
Zhao et al.

(10) Patent No.: US 9,988,857 B2
(45) Date of Patent: *Jun. 5, 2018

(54) METHOD FOR MANUFACTURING SUPERIOR 13CR FRICTION-WELDED DRILLROD

(71) Applicant: BAOSHAN IRON & STEEL CO., LTD., Shanghai (CN)

(72) Inventors: Peng Zhao, Shanghai (CN); Jie Yu, Shanghai (CN); Changfu Dong, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 262 days.

This patent is subject to a terminal disclaimer.

(21) Appl. No.: 14/784,446

(22) PCT Filed: Oct. 9, 2013

(86) PCT No.: PCT/CN2013/084875
§ 371 (c)(1),
(2) Date: Oct. 14, 2015

(87) PCT Pub. No.: WO2014/169592
PCT Pub. Date: Oct. 23, 2014

(65) Prior Publication Data
US 2016/0076315 A1    Mar. 17, 2016

(30) Foreign Application Priority Data

Apr. 19, 2013  (CN) .......................... 2013 1 0138437

(51) Int. Cl.

| | |
|---|---|
| *E21B 17/042* | (2006.01) |
| *F16L 15/00* | (2006.01) |
| *C21D 6/00* | (2006.01) |
| *B23K 20/12* | (2006.01) |
| *C22C 38/44* | (2006.01) |
| *E21B 17/00* | (2006.01) |
| *C21D 9/50* | (2006.01) |
| *C21D 1/30* | (2006.01) |
| *C21D 1/58* | (2006.01) |
| *C21D 9/08* | (2006.01) |
| *C21D 9/14* | (2006.01) |
| *C22C 38/02* | (2006.01) |
| *C22C 38/04* | (2006.01) |
| *F16L 13/02* | (2006.01) |
| *C21D 9/22* | (2006.01) |

(52) U.S. Cl.
CPC ............ *E21B 17/042* (2013.01); *B23K 20/12* (2013.01); *B23K 20/129* (2013.01); *C21D 1/30* (2013.01); *C21D 1/58* (2013.01); *C21D 6/004* (2013.01); *C21D 6/005* (2013.01); *C21D 6/008* (2013.01); *C21D 9/085* (2013.01); *C21D 9/14* (2013.01); *C21D 9/50* (2013.01); *C21D 9/505* (2013.01); *C22C 38/02* (2013.01); *C22C 38/04* (2013.01); *C22C 38/44* (2013.01); *E21B 17/00* (2013.01); *F16L 13/02* (2013.01); *F16L 15/00* (2013.01); *C21D 6/002* (2013.01); *C21D 9/22* (2013.01)

(58) Field of Classification Search
CPC ....... E21B 17/042; E21B 17/00; C22C 38/04; C22C 38/02; C22C 38/44; B23K 20/129; B23K 20/12; F16L 13/02; F16L 15/00; C21D 17/00; C21D 1/58; C21D 6/004; C21D 6/005; C21D 6/008; C21D 9/085; C21D 9/14; C21D 9/505; C21D 1/30; C21D 9/50

See application file for complete search history.

(56) References Cited

U.S. PATENT DOCUMENTS

2005/0093296 A1    5/2005  Hall et al.

FOREIGN PATENT DOCUMENTS

| CN | 101581200 A | 11/2009 |
|---|---|---|
| CN | 102399970 A | 4/2012 |

OTHER PUBLICATIONS

Zhao, Super 13cr Drill Pipe Developed by Baoshan Iron & Steel Co. Ltd. is Applied Successfully in Tarim Oilfield, Steel Pipe, 2013, 42(2):5 [No English Language Translation Available].
PCT International Search Report, PCT/CN2013/084875, dated Jan. 23, 2014, 6 pages.

*Primary Examiner* — John C Hong
(74) *Attorney, Agent, or Firm* — Quarles & Brady LLP

(57) ABSTRACT

The present invention provides a method for manufacturing a superior 13Cr friction-welded drillrod, the method comprising the following steps: manufacturing a superior 13Cr tube body; manufacturing a superior 13Cr internally threaded coupler and a superior 13Cr externally threaded coupler, respectively; connecting the superior 13Cr internally threaded coupler and the superior 13Cr externally threaded coupler respectively to the two ends of the superior 13Cr tube body by means of frictional butt welding; after heating seam areas to 950° C.-1000° C., cooling same to below 200° C. by ejecting compressed air onto the surfaces of the seam areas, and then cooling the seam areas to room temperature by spraying water; and tempering the seam areas by heating same to 640° C.-700° C. By the present method, a superior 13Cr friction-welded drillrod can be manufactured, which, in the case of the exploration of a gas filed containing a relatively high level of $CO_2$, can be not only used as a drillrod in an earlier stage of nitrogen well-drilling operation, but also used as an oil tube in a later stage of well completion with oil tube.

10 Claims, No Drawings

… (1)

METHOD FOR MANUFACTURING SUPERIOR 13CR FRICTION-WELDED DRILLROD

CROSS-REFERENCE TO RELATED APPLICATIONS

This application represents the national stage entry of PCT International Application No. PCT/CN2013/084875 filed Oct. 9, 2013, which claims priority of Chinese Patent Application No. 201310138437.7 filed Apr. 19, 2013, the disclosures of which are incorporated by reference here in their entirety for all purposes.

FIELD OF THE INVENTION

The present invention relates to a high alloy drillrod, and in particular a friction-welded high alloy drillrod.

BACKGROUND ART

Drillrods for use in oil and natural gas exploration are manufactured according to the API SPEC 5DP standards. The structure thereof has an externally threaded drillrod coupler and an internally threaded drillrod coupler which are respectively frictionally butt-welded at the two ends of the drillrod tube body. Drillrods in compliance with the API SPEC 5DP standards are of a low alloy steel material.

With the development of the oil industry, the conditions in which drillrods operate become more and more severe, drillrods of the low alloy steel material as per the API SPEC 5DP standards now fail to fulfill the increasingly harsh requirements of well drilling operation, and there exists an urgent need for a high alloy drillrod. To this end, aluminum alloy drillrods and titanium alloy drillrods appeared on the market. The aluminum alloy drillrods are manufactured as per the ISO 15546 standards. The aluminum alloy drillrod is formed from an aluminum alloy drillrod tube body connected by means of fine threads with an externally threaded coupler made of low alloy steel and an internally threaded coupler made of low alloy steel. The structure of the titanium alloy drillrod is similar to that of the aluminum alloy drillrod.

The utilization of the aluminum alloy drillrod and the titanium alloy drillrod has two major objectives as follows: one is to drill a super deep well by taking advantage of the low specific gravity property of the aluminum alloy drillrod and the titanium alloy drillrod, and the other is to drill a sulfur-containing well by taking advantage of the resistance property of the aluminum alloy drillrod and the titanium alloy drillrod to stress corrosion by sulfides.

For some $CO_2$-containing gas fields whose stratum is of compact sandstone, in the case of a conventional method of operation which employs a drillrod for drilling a well and an oil tube for completing the well, the yield is only tens of thousands of cubic meters/day; in addition, superior 13Cr high alloy oil tube products must be used in a gas field containing a relatively high level of $CO_2$, resulting in an extremely low yield of production and an extremely high cost, meaning low value in industrial exploration.

If a nitrogen well-drilling process can be employed, the above-mentioned problem can be solved and a high yield of millions of cubic meters of natural gas per day can be achieved. However, when the nitrogen well-drilling process is used, the drillrod cannot be lifted out to exchange into the oil tube for well completion, otherwise the production layer would be contaminated, lowering the yield back to tens of thousands of cubic meters/day. This gives rise to the need of a superior 13Cr high alloy drillrod product resistant to $CO_2$ corrosion. The product is required to not only be able to be used as a drillrod in an earlier stage of nitrogen well-drilling operation, and also be able to be used as an oil tube in a later stage of well completion with oil tube.

SUMMARY OF THE INVENTION

An object of the present invention is to provide a method for manufacturing a superior 13Cr friction-welded drillrod, which method can be used to produce a superior 13Cr friction-welded drillrod for use not only as a drillrod in an earlier stage of nitrogen well-drilling operation, and also as an oil tube in a later stage of well completion with oil tube, in the case of the exploration of a gas filed containing a relative high level of $CO_2$.

According to the above-mentioned object, the present invention proposes a method for manufacturing a superior 13Cr friction-welded drillrod, which method comprises the following steps:

manufacturing a superior 13Cr tube body;

manufacturing a superior 13Cr internally threaded coupler and a superior 13Cr externally threaded coupler, respectively;

connecting the superior 13Cr internally threaded coupler and the superior 13Cr externally threaded coupler respectively to the two ends of the superior 13Cr tube body by means of frictional butt welding;

after heating seam areas to 950° C.-1000° C., cooling same to below 200° C. by ejecting compressed air onto the surfaces of the seam areas, and then cooling same to room temperature by spraying water; and tempering the seam areas by heating same to 640° C.-700° C.

Existing high alloy drillrods, including aluminum alloy drillrods and titanium alloy drillrods, are all formed by connecting steel couplers to an aluminum alloy or titanium alloy tube body by means of fine threads. There are two problems with this connection method: firstly, the strength of the connection by means of fine threads is low, such that the drillrod is easily broken at the connection; and secondly, there are galvanic corrosions between the steel couplers and the aluminum alloy or titanium alloy tube body, easily causing severe corrosions at the steel couplers. The technical solution according to the present invention overcomes the drawback of the fine threaded connection with previous high alloy drillrods, by connecting together the high alloy tube body and the threaded couplers of the same material in a frictional butt welding process.

In the present technical solution, the quenching process and the tempering process are very important.

Furthermore, in the method for manufacturing a superior 13Cr friction-welded drillrod described above, said superior 13Cr tube body, said superior 13Cr internally threaded coupler and said superior 13Cr externally threaded coupler have a chemical composition of: C 0.01%-0.05%, Si≤0.5%, Mn 0.2%-1.0%, Cr 12%-14%, Mo 1%-3%, Ni 4%-6%, and a balance of Fe and inevitable impurities.

Furthermore, in the method for manufacturing a superior 13Cr friction-welded drillrod described above, the step of manufacturing a superior 13Cr tube body comprises: manufacturing a tube body; thickening the ends of the tube body to obtain a tube body with thickened tube ends; heating the tube body; cooling the tube body; and tempering the tube body.

Furthermore, the temperature for thickening the tube ends is 1150° C.-1200° C.

Furthermore, in the tempering step, the tempering temperature for the tube body is 600° C.-650° C.

Furthermore, in the step of heating the tube body, the tube body is heated to 950° C.-1000° C.

Optionally, in the step of cooling the tube body, air is used as a cooling medium for cooling the tube body.

Preferably, in the step of cooling the tube body, oil is used as a cooling medium for cooling the tube body.

Furthermore, in the method for manufacturing a superior 13Cr friction-welded drillrod described above, the steps of manufacturing a superior 13Cr internally threaded coupler and a superior 13Cr externally threaded coupler both comprise: manufacturing a blank; forging the blank; heating the forged blank to 600° C.-700° C. for a stress-relief annealing; quenching; and tempering.

Furthermore, said quenching is an oil quenching and the quenching temperature is 950° C.-1000° C.

By the method for manufacturing a superior 13Cr friction-welded drillrod according to the present invention, a high-quality superior 13Cr high alloy drillrod can be produced, which, when used as a drillrod, has a high strength of connection and will not break at the fine threaded connection point due to the frictional butt welding of the couplers to the tube body; and when used as an oil tube, will not produce severe corrosions at the couplers because the couplers and the tube body are of the same material so that there is no galvanic corrosion.

DETAILED DESCRIPTION OF THE INVENTION

The method for manufacturing a superior 13Cr friction-welded drillrod according to the present invention is described below in more details, in conjunction with particular embodiments.

Embodiments 1-5

A superior 13Cr friction-welded drillrod is manufactured in the following steps:

(1) manufacturing a superior 13Cr tube body:

(1a) obtaining a tube body, with the composition formulation of the tube body being controlled to be C 0.01%-0.05%, Si≤0.5%, Mn 0.2%-1.0%, Cr 12%-14%, Mo 1%-3%, Ni 4%-6%, and a balance of Fe and inevitable impurities (the composition formulations for embodiment 1-5 are shown in table 1);

(1b) thickening the ends of the tube body to obtain a tube body with thickened ends, with the temperature for thickening the tube ends being controlled at 1150° C.-1200° C.;

(1c) heating the tube body to 950° C.-1000° C.;

(1d) oil cooling the tube body; and (1f) tempering the tube body, with the tempering temperature being 600° C.-650° C., so as to achieve a mechanical feature of 110 ksi at the tube body and the thickened ends;

(2) manufacturing a superior 13Cr internally threaded coupler and a superior 13Cr externally threaded coupler, respectively, with the composition formulations thereof being controlled to be the same as that of the tube body:

(2a) obtaining a blank;

(2b) forging the blank at 1150° C.-1200° C.;

(2c) heating the forged blank to 600° C.-700° C. for a stress-relief annealing;

(2d) rough machining the blank;

(2e) after heating the rough machined blank to 950° C.-1000° C., quenching and cooling same in an oil tank; and (2f) tempering, with the tempering temperature being controlled at 600° C.-650° C.;

(3) connecting the superior 13Cr internally threaded coupler and the superior 13Cr externally threaded coupler respectively to the two ends of the superior 13Cr tube body by means of frictional butt welding;

(4) after heating seam areas to 950° C.-1000° C., cooling same to below 200° C. by ejecting compressed air onto the surfaces of the seam areas, and then cooling the seam areas to room temperature by spraying water; and (5) tempering the seam areas by heating to 640° C.-700° C.

The composition formulations of the tube bodies and couplers in embodiments 1-5 of the present application are shown in table 1.

TABLE 1

(wt %, with a balance of Fe and other inevitable impurities)

| Type of Steel | C | Si | Mn | Cr | Mo | Ni |
|---|---|---|---|---|---|---|
| Embodiment 1 | 0.04 | 0.24 | 0.35 | 12.2 | 1.9 | 5.8 |
| Embodiment 2 | 0.03 | 0.32 | 0.52 | 12.9 | 2.8 | 4.1 |
| Embodiment 3 | 0.02 | 0.36 | 0.95 | 13.8 | 1.2 | 5.2 |
| Embodiment 4 | 0.03 | 0.42 | 0.82 | 13.5 | 2.1 | 4.3 |
| Embodiment 5 | 0.04 | 0.28 | 0.45 | 12.5 | 1.3 | 5.5 |

Process parameters in embodiments 1-5 of the present application are listed in table 2.

TABLE 2

| Type of Steel | Temperature for thickening tube ends, ° C. | Tube body quenching temperature, ° C. | Tube body tempering temperature, ° C. | Coupler annealing temperature, ° C. | Coupler quenching temperature, ° C. | Seam quenching temperature, ° C. | Seam air cooling temperature, ° C. | Seam tempering temperature, ° C. |
|---|---|---|---|---|---|---|---|---|
| Embodiment 1 | 1160 | 980 | 640 | 680 | 960 | 980 | 190 | 650 |
| Embodiment 2 | 1180 | 970 | 630 | 650 | 970 | 970 | 105 | 670 |
| Embodiment 3 | 1170 | 960 | 620 | 620 | 980 | 960 | 135 | 700 |
| Embodiment 4 | 1185 | 990 | 610 | 660 | 975 | 975 | 155 | 660 |
| Embodiment 5 | 1190 | 975 | 625 | 640 | 990 | 990 | 180 | 640 |

Properties of the respective tube body and seams in embodiments 1-5 of the present application are shown in table 3.

TABLE 3

| Type of Steel | Tube body yield strength, MPa | Tube body tensile strength, MPa | Seam yield strength, MPa | Seam tensile strength, MPa |
|---|---|---|---|---|
| Embodiment 1 | 830 | 955 | 867 | 958 |
| Embodiment 2 | 870 | 980 | 832 | 920 |
| Embodiment 3 | 925 | 990 | 775 | 871 |
| Embodiment 4 | 955 | 1050 | 851 | 935 |
| Embodiment 5 | 910 | 990 | 883 | 965 |

It can be seen from table 2 and table 3 that the tube body of the superior 13Cr friction-welded drillrod manufactured by the method according to the present technical solution can achieve a mechanic feature of 110 ksi, and the seams can also achieve a mechanic feature of 110 ksi.

It should be noted that what are set forth above are only particular embodiments of the present invention, and that clearly the present invention is not to be limited to these embodiments, but covers many similar variations thereof. All of the variations either directly derived from or associated with the disclosure of the present invention by those skilled in the art will fall into the protective scope of the present invention.

The invention claimed is:

1. A method for manufacturing a 13Cr friction-welded drillrod, the method comprising:
   a) manufacturing a 13Cr tube body having two opposing ends;
   b) manufacturing a 13Cr internally threaded coupler and a 13Cr externally threaded coupler, respectively;
   c) connecting the 13Cr internally threaded coupler and the 13Cr externally threaded coupler respectively to the two opposing ends of the 13Cr tube body;
   d) heating seam areas between the coupler and tube ends to 950° C.-1000° C.;
   e) cooling the heated seam areas to below 200° C.;
   f) cooling the seam areas to room temperature; and
   g) tempering the seam areas by heating the seam areas to 640° C.-700° C.

2. The method of claim 1, wherein the 13Cr tube body, 13Cr internally threaded coupler and 13Cr externally threaded coupler comprise 0.01%-0.05 wt % carbon (C), ≤0.5 wt % silicon (Si), 0.2%-1.0 wt % manganese (Mn), 12%-14 wt % chromium (Cr), 1%-3 wt % molybdenum (Mo); 4%-6 wt % nickel (Ni), and a balance of iron (Fe) and other impurities.

3. The method of claim 1, wherein the step of manufacturing a 13Cr tube body comprises manufacturing a tube body having two opposing ends; thickening the opposing ends of the tube body to obtain a tube body with thickened tube ends; heating the thickened tube body; cooling the thickened tube body; and tempering the thickened tube body.

4. The method of claim 3, wherein the temperature for thickening the tube ends ranges from 1150° C.-1200° C.

5. The method of claim 3, wherein the tube body is heated to 950° C.-1000° C.

6. The method of claim 3, wherein air is used as a cooling medium for cooling the tube body.

7. The method of claim 3, wherein oil is used as a cooling medium for cooling the tube body.

8. The method of claim 3, wherein the temperature for tempering the tube body is 600° C.-650° C.

9. The method of claim 1, wherein the steps of manufacturing a 13Cr internally threaded coupler and a 13Cr externally threaded coupler both comprise manufacturing a blank; forging the blank; heating the forged blank to a temperature ranging from 600° C.-700° C. for a stress-relief annealing; quenching the heated blank; and tempering the quenched blank.

10. The method of claim 9, wherein the quenching is an oil quenching and the quenching temperature ranges from 950° C.-1000° C.

* * * * *